(12) United States Patent
Beierl et al.

(10) Patent No.: US 11,827,284 B2
(45) Date of Patent: Nov. 28, 2023

(54) MOTOR VEHICLE SIDE SPOILER ARRANGEMENT

(71) Applicant: Dr. Ing. h.c. F. Porsche Aktiengesellschaft, Stuttgart (DE)

(72) Inventors: Dominik Beierl, Korntal-Münchingen (DE); Joachim Paul, Benningen a.N. (DE); Henrik Heidorn, Renningen (DE); Haiko Neher, Sachsenheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 13 days.

(21) Appl. No.: 17/825,018

(22) Filed: May 26, 2022

(65) Prior Publication Data

US 2023/0001991 A1 Jan. 5, 2023

(30) Foreign Application Priority Data

Jul. 5, 2021 (DE) .......................... 102021117255.1

(51) Int. Cl.
*B62D 35/00* (2006.01)

(52) U.S. Cl.
CPC .................................. *B62D 35/008* (2013.01)

(58) Field of Classification Search
CPC ..... B62D 35/00; B62D 35/007; B62D 35/008
USPC .............................. 296/180.1, 180.3, 180.5
See application file for complete search history.

(56) References Cited

U.S. PATENT DOCUMENTS

2020/0369331 A1\* 11/2020 Ferri .................... B62D 35/008
2020/0391811 A1 12/2020 Han et al.

FOREIGN PATENT DOCUMENTS

| DE | 102008036170 A1 \* | 2/2010 | ............ B60R 13/07 |
|----|------|------|------|
| DE | 102014105514 A1 | 10/2015 | |
| DE | 102017201860 A1 | 8/2018 | |
| DE | 102018213034 A1 | 2/2020 | |
| GB | 2528924 A | 2/2016 | |
| WO | 2016020423 A1 | 2/2016 | |

\* cited by examiner

*Primary Examiner* — Jason S Daniels
(74) *Attorney, Agent, or Firm* — RatnerPrestia

(57) ABSTRACT

A motor vehicle side spoiler arrangement with a spoiler blade which can be moved in a motorized manner between a retracted rest position and a laterally extended spoiler position. A spoiler shell is fixed on the vehicle and provided with a shell rear wall, a guide mechanism which guides the spoiler blade in the longitudinal direction, and an actuating motor. A sliding seal lip is provided between the spoiler blade and the shell rear wall, which sliding seal lip closes a front-side gap (S) between the spoiler blade and the shell rear wall in the spoiler position of the spoiler blade.

6 Claims, 2 Drawing Sheets

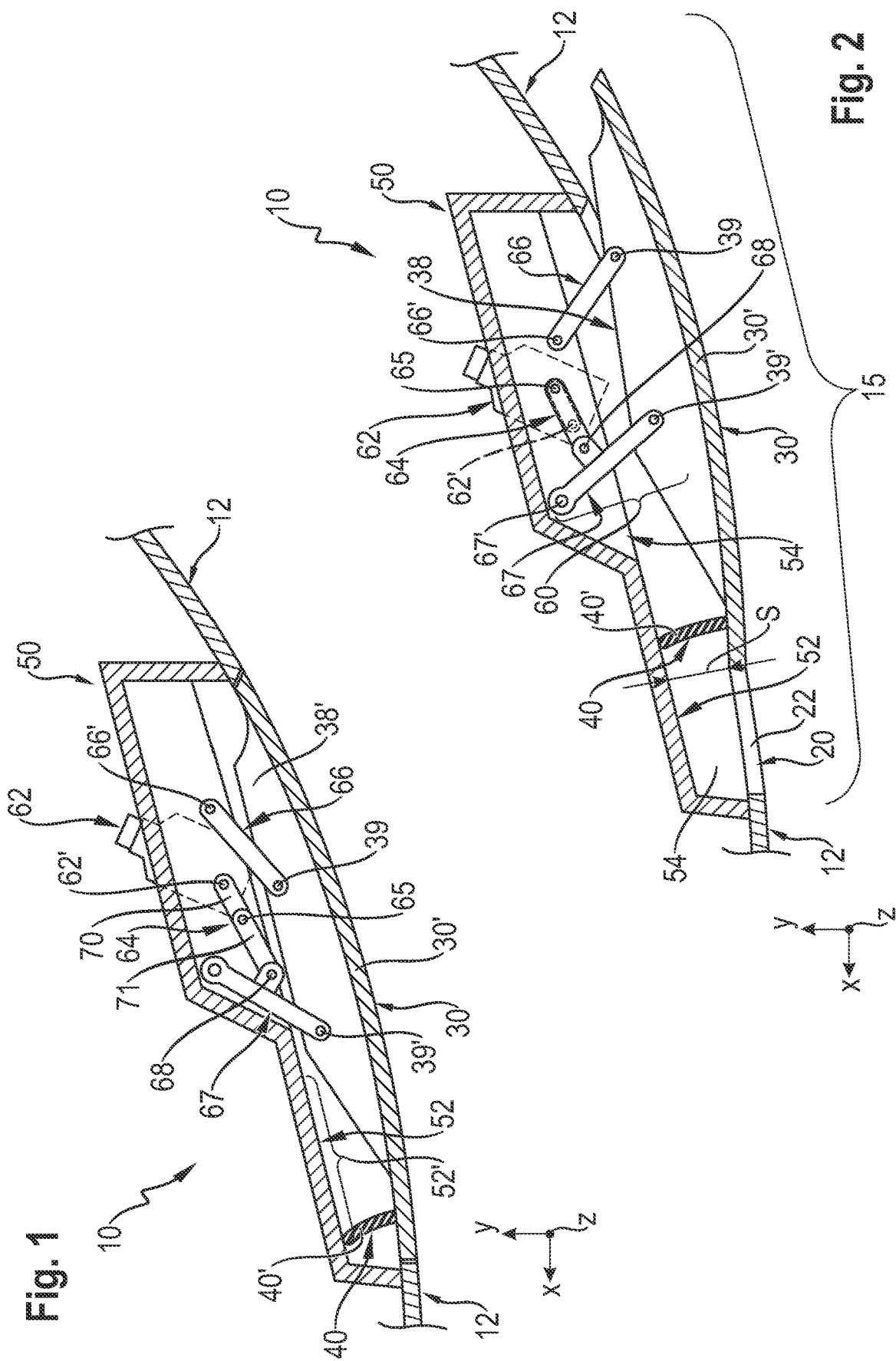

Figure 3:
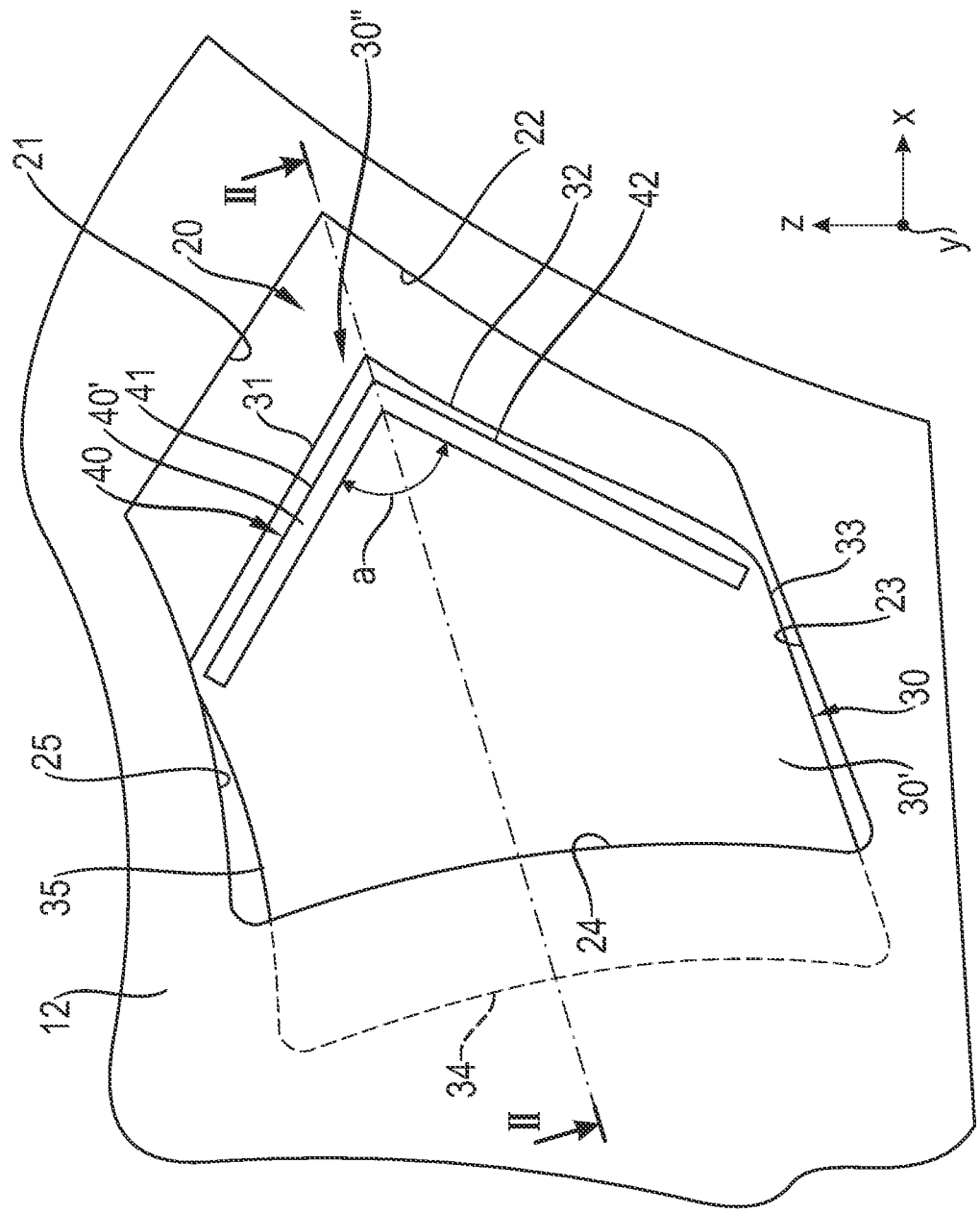

ated in a motorized manner, in particular to a rear side spoiler arrangement, of which in each case one is provided on the left-hand side and the right-hand side of the motor vehicle.

MOTOR VEHICLE SIDE SPOILER ARRANGEMENT

CROSS-REFERENCE TO RELATED APPLICATION

This application claims priority to German Patent Application No. 10 2021 117 255.1, filed Jul. 5, 2021, the content of such application being incorporated by reference herein in its entirety.

FIELD OF THE INVENTION

The invention relates to a motor vehicle side spoiler arrangement which can be activated in a motorized manner, in particular to a rear side spoiler arrangement, of which in each case one is provided on the left-hand side and the right-hand side of the motor vehicle.

BACKGROUND OF THE INVENTION

In a similar manner to a top-side spoiler arrangement, a motor vehicle side spoiler arrangement serves for the controlled lateral air flow breakaway. Lateral wing and spoiler arrangements are known, for example, from DE 10 2017 201 860 A1, DE 10 2018 213 034 A1 and WO 2016 020 423 A1, which are each incorporated herein by reference in their entirety. In the case of a side spoiler arrangement which can be activated in a motorized manner, a spoiler blade can be moved by way of an actuating motor out of an aerodynamically function-less rest position into a spoiler position which is extended to the side and to the rear. In the spoiler position, a flow behind the spoiler blade has to be prevented, that is to say it has to be prevented that a significant air flow which would considerably increase the air resistance arises between the extended spoiler blade and the motor vehicle body.

SUMMARY OF THE INVENTION

Described herein is a motor vehicle side spoiler arrangement that can be activated in a motorized manner and has low air resistance in the spoiler position of the spoiler blade. The motor vehicle side spoiler arrangement according to aspects of the invention has a spoiler blade which can be moved in a motorized manner and is the essential aerodynamically active part of the side spoiler arrangement. The spoiler blade is, in particular, a body which is smooth-surfaced on the outer side and, in the retracted state, is particularly preferably seated in a vehicle body opening and closes the latter completely here without a step. The spoiler blade is moved by way of a preferably electric actuating motor between a retracted rest position, in which the spoiler blade does not have any appreciable aerodynamic function, and a laterally extended spoiler position. Here, the spoiler blade carries out both a lateral and longitudinally directed movement in a horizontal plane, in each case in relation to the vehicle axes. The longitudinally directed movement into the spoiler position preferably takes place toward the rear, not toward the front. In the present case, this is particularly preferably a rear-side side spoiler arrangement, in each case one spoiler arrangement being provided on the vehicle both on the left-hand and on the right-hand side.

On the vehicle side, a spoiler shell which is fixed on the vehicle is provided with a shell rear wall. The spoiler shell with the shell rear wall forms and closes off a receiving space for a guide mechanism and the actuating drive for guiding and actuating the spoiler blade. The spoiler shell is preferably seated behind a vehicle body opening, and is preferably largely fluid-tight, with the result that no moisture or water can pass into the space which lies proximally behind the spoiler shell even in the case of an extended spoiler blade. The guide mechanism holds and guides the spoiler blade, the movement, defined by way of the guide mechanism, of the spoiler blade between its retracted and its extended position having both a movement component in the longitudinal direction and a movement component in the transverse direction, that is to say being moved outward away from the vehicle body and toward the rear in the case of the opening movement.

The guide mechanism can be configured, for example, as a parallelogram guide, by way of which a displacement movement in the transverse direction and in the longitudinal direction and possibly also a slight rotation of the spoiler blade are defined.

A sliding seal lip is provided as underflow protection between the spoiler blade, extended into its spoiler position, and the shell rear wall, which sliding seal lip aerodynamically closes a front-side gap between the spoiler blade and the shell rear wall in the extended spoiler blade position. As a result, the air stream which comes from the front during driving operation is largely deflected upward and/or downward or distally to the side, and the air stream cannot flow proximally behind the spoiler blade. The sliding seal lip is connected by way of its lip base fixedly on the vehicle or, as an alternative, fixedly to the spoiler blade, and slides with its lip tip, during the retraction and the extension of the spoiler blade, on the opposite surface, that is to say on the spoiler blade or on a vehicle-side surface. The sliding seal lip is particularly preferably fixed on the spoiler blade, and lies on the shell rear wall with its lip tip which forms a sliding edge. This arrangement has the advantage that, in particular, the sliding seal lip is arranged in an aerodynamically optimum manner even in intermediate positions of the spoiler blade between the completely retracted and completely extended spoiler blade position, for example always at the front end of the spoiler blade.

The sliding seal lip preferably consists of an elastic lip body which is prestressed elastically in such a way that it is adapted to the varying front-side gap between the completely retracted and completely extended spoiler blade position and always largely or completely closes the front-side gap here.

The shell rear wall is preferably of substantially smooth-surfaced configuration in the entire sliding region, on which the sliding seal lip slides between the completely retracted and the completely extended spoiler blade position, with the result that the lip tip-side sliding edge of the sliding seal lip is not damaged when sliding on the shell rear wall in the sliding region.

The front end of the spoiler blade is preferably V-shaped in side view, and the sliding seal lip is arranged or oriented in a similarly V-shaped manner along the front end of the spoiler blade, the tapered middle part of the front end pointing toward the front. As a result of the V-shaped nature of the spoiler blade front end, the air stream which strikes the spoiler blade front end or the sliding seal lip from the front is split, and is deflected upward and downward, with the result that no accumulation of air arises here.

BRIEF DESCRIPTION OF THE DRAWING FIGURES

In the following text, one exemplary embodiment of the invention will be described in greater detail on the basis of the figures, in which:

FIG. 1 shows a horizontal section of a left-hand-side motor vehicle side spoiler arrangement in the retracted rest position of the spoiler blade, FIG. 2 shows a horizontal section II-II of the motor vehicle side spoiler arrangement of FIG. 1 in the extended spoiler position of the spoiler blade, and FIG. 3 shows an inner-side top view of the spoiler blade of FIG. 2.

DETAILED DESCRIPTION OF THE INVENTION

The figures show a left-hand-side motor vehicle side spoiler arrangement 15 with a spoiler blade 30 which can be moved in a motorized manner. In the present case, the spatial directions relate to the motor vehicle 10, with the result that the horizontal longitudinal axis x is the driving direction, the horizontal transverse axis y is the vehicle transverse axis, and the vertical z specifies the vertical axis of the vehicle 10. The spoiler blade 30 lies approximately in a vertical longitudinal plane xz and, in its rest position which is shown in FIG. 1, closes a vehicle body opening 20 in the vehicle body outer skin 12 completely and without a step.

The spoiler blade 30 is tapered in a V-shaped manner at its front end 30", as can be seen in FIG. 3, with the result that the two front-side straight blade edges 31, 32 enclose an angle a of approximately 80°. The other three spoiler blade edges 33, 34, 35 are approximately at a right angle with respect to one another and are oriented approximately horizontally or vertically. The vehicle body opening 20 has five opening edges 21, 22, 23, 24, 25 which correspond to the blade edges 31-35.

On the right-hand-side, the motor vehicle 10 has a second side spoiler arrangement (not shown) which is practically of mirror-symmetrical configuration with respect to the left-hand-side side spoiler arrangement 15 which is shown in the figures. In its spoiler position which is shown in FIGS. 2 and 3, the spoiler blade 30 has been moved laterally outward and rearward in the longitudinal direction in comparison with its rest position which is shown in FIG. 1. In its spoiler position, the spoiler blade 30 ensures an improved flow breakaway.

The spoiler blade 30 is formed by way of a spoiler blade body 30' which is of substantially smooth-surfaced configuration on the inner side and on the outer side, and is held by way of a guide mechanism 60 which is configured as a parallelogram guide and is actuated by way of an electric actuating motor 62 via a toggle lever arrangement 64. The guide mechanism 60 has two pivotable guide arms 66, 67 which are substantially parallel to one another, are articulated rotatably on the vehicle side via rotary joints 66', 67' which are fixed on the vehicle, and hold and guide the spoiler blade 30 on a spoiler blade reinforcing rib 38 via rotary joints 39, 39'.

The actuating motor 62 rotates a rotational arm 70 of the toggle lever arrangement 64 about the motor shaft 62', with the result that the rotational arm 70 actuates a toggle lever 71 via an end-side toggle lever joint 65, which toggle lever 71 actuates a rotary joint 68 of the front pivoting arm 67 by way of its other end.

The guide mechanism 60, the toggle lever arrangement 64 and the actuating motor 62 are accommodated in a spoiler shell 50 which is fixed on the vehicle, in such a way that the spoiler blade 30 does not protrude distally out of the vehicle body opening 20 in its retracted rest position. The spoiler shell 50 has, inter alia, a bottom wall 54 which lies approximately in a horizontal plane and a shell rear wall 52 which lies approximately in a vertical plane, the basic plane of which is oriented approximately parallel to the opening plane of the vehicle body opening 20 in the front region of the spoiler shell 50, which front region forms the sliding region 52'. The V-shaped sliding region 52' of the shell rear wall 52 is of smooth-surfaced configuration.

A V-shaped sliding seal lip 40 is arranged between the spoiler blade 30 and the shell rear wall 52, which sliding seal lip 40 is arranged with its two lip arms 41, 42, lying in a V-shaped manner with respect to one another, immediately adjoining or, as in the present case, spaced apart by way of a small longitudinal spacing and parallel to the two front-side blade edges 31, 32. The sliding seal lip 40 consists of an elastic plastic lip body 40', the lip base of which is fixed on the proximal inner side of the spoiler blade 30, for example is adhesively bonded to the latter.

The lip tip of the lip body 40' always lies slidingly on the shell rear wall 52 in the sliding region 52', to be precise both in the retracted rest position and in the completely extended spoiler position of the spoiler blade 30. As a result, the front-side gap S between the spoiler blade 30 or its two front blade edges 31, 32 firstly and the shell rear wall 52 in the entire sliding region 52' secondly is closed aerodynamically over the entire front side, with the result that the incident air from the front is deflected, inter alia, upward and downward and to the outside, and does not flow behind the spoiler blade 30.

What is claimed is:

1. A motor vehicle side spoiler arrangement comprising:
   an actuating motor;
   a spoiler blade which is configured to be moved in a motorized manner by the actuating motor between a retracted rest position and a laterally extended spoiler position;
   a spoiler shell which is fixed on the vehicle and includes a shell rear wall and a guide mechanism which guides the spoiler blade in a longitudinal direction; and
   a sliding seal lip disposed between the spoiler blade and the shell rear wall, which sliding seal lip closes a front-side gap (S) between the spoiler blade and the shell rear wall in the laterally extended spoiler position of the spoiler blade,
   wherein a front end of the spoiler blade is V-shaped, and the sliding seal lip is arranged in a V-shaped manner along the front end of the spoiler blade.

2. The motor vehicle side spoiler arrangement as claimed in claim 1, the sliding seal lip having one end that is fixed on the spoiler blade and another end that is positioned in contact with the shell rear wall.

3. The motor vehicle side spoiler arrangement as claimed in claim 1, wherein the sliding seal lip comprises an elastic lip body.

4. The motor vehicle side spoiler arrangement as claimed in claim 1, wherein the guide mechanism is configured as a parallelogram guide.

5. The motor vehicle side spoiler arrangement as claimed in claim 1, wherein the shell rear wall has a smooth-surfaced configuration in an entire sliding region of the sliding seal lip.

6. A motor vehicle comprising the motor vehicle side spoiler arrangement of claim 1.

* * * * *